Patented Feb. 22, 1949

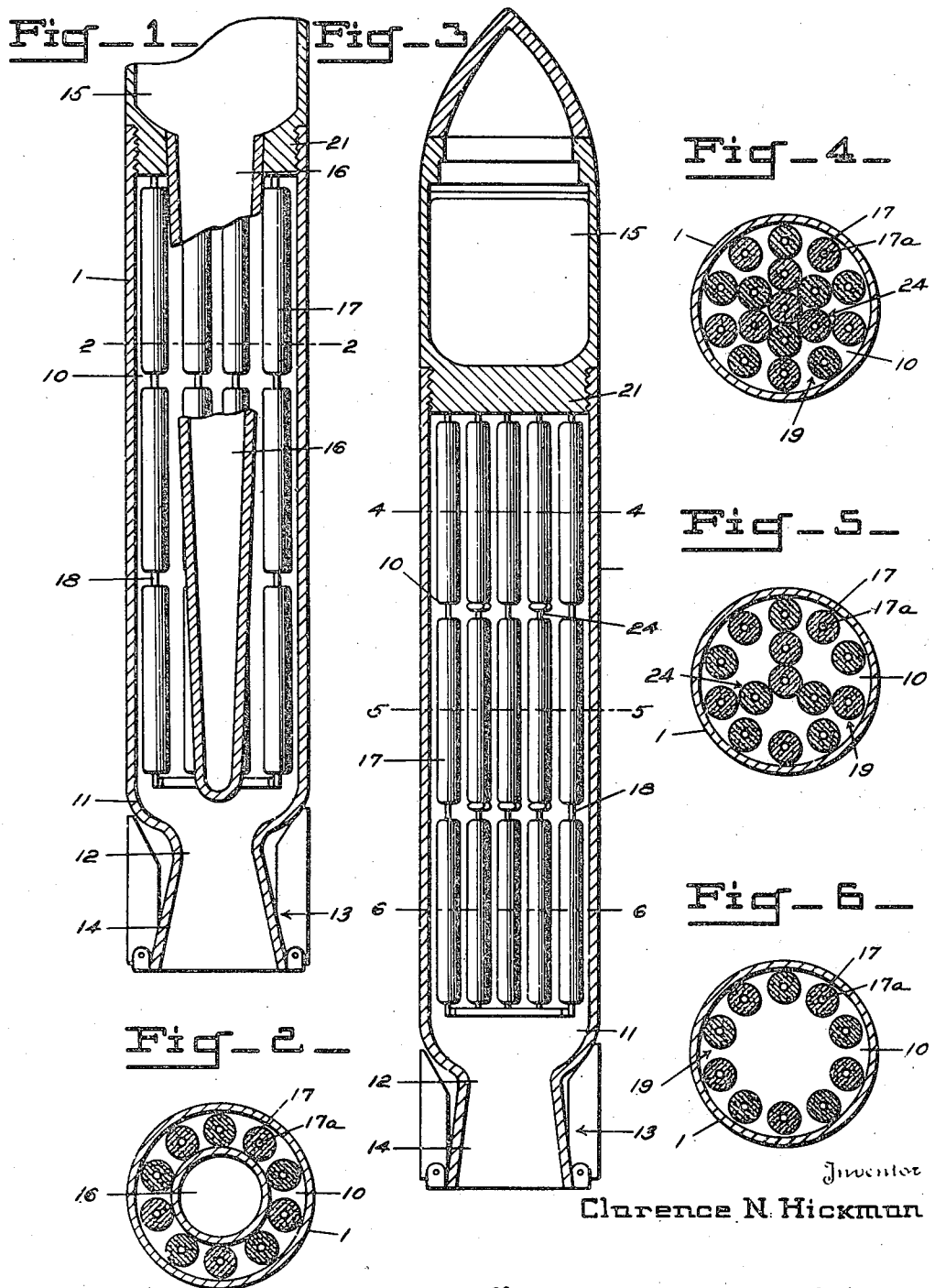

2,462,099

UNITED STATES PATENT OFFICE 2,462,099

ROCKET PROJECTILE

Clarence N. Hickman, Jackson Heights, N. Y., assignor to the United States of America as represented by the Secretary of War Application May 15, 1946, Serial No. 669,766

2 Claims. (Cl. 102—49)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to rocket projectiles and more particularly to a rocket motor for a rocket propelled projectile.

The essential parts of any rocket, and particularly a military rocket, are (1) the "pay load" which in a military rocket comprises a head containing high explosive and fragmentary material, (2) the "dead load" consisting of the combustion chamber, and its appurtenances, including a nozzle for ejecting propellent gases, a trap for retaining the propellant within the chamber and the stabilizing fins, and (3) the rocket propellant. The combustion chamber for reasons of manufacturing economy preferably takes a form of a piece of cylindrical tubing secured at its forward end to the "pay load" container and provided at the rear end with a nozzle of the Venturi type which may be integrally formed from the tubing of the combustion chamber. The type of propellant found to be particularly desirable at present for rocket projectiles comprises a plurality of cylindrical grains of "ballistite" which is a double base powder made by gelantinizing and colloiding mixtures of nitrocellulose and nitroglycerin. Each powder grain preferably has a concentric perforation formed therethrough and may thus be supported within the combustion chamber by being strung on trap wire which extends longitudinally with respect to the combustion chamber.

In designing military rockets, it is always desirable to have as large a "pay load" as possible for a given size rocket designed for a specific velocity or range. Obviously in order to achieve this, the projectile must have a minimum "dead load" and since it is the weight of the combustion chamber which forms a major part of the "dead load," it has long been a major problem of rocket projectile designers to achieve a chamber with a minimum wall thickness consistent with safety.

The wall thickness of any of the combustion chambers of any type of rocket projectile is primarily determined by its bursting strength which must exceed the maximum pressure that can be expected to be developed within the combustion chamber. Thus, for any combustion chamber having a given interior diameter and wall thickness, the problem is to pack as much propellant within the chamber as possible to achieve greatest range, yet at the same time arrange the propellant so that maximum pressure developed will not exceed the bursting strength of the combustion chamber and thereby require a thick wall section for the combustion chamber which would increase the "dead load" and cut down the range of the projectile.

In accordance with this invention, it has been discovered that an optimum design of the combustion chamber of rocket projectiles results from the correlation of the free port area to the burning surface area of a propellant. "Free port" area is a term commonly utilized to indicate at any point along the length of the combustion chamber, the cross-sectional area of the powder free space, or in other words, it is an indication of the passage area through the propellent charge available for the passage of the propellent gases developed by the burning of the propellant.

In accordance with this invention, it has been discovered that if the free port area is made too small relative to the burning surface area, excessive pressures will be developed within the combustion chamber requiring increase in thickness of the wall of the combustion chamber for safety, and on the other hand, if the free port area is made too large with respect to the burning surface area, optimum rocket performance will not be obtained. In other words, for a given rocket, in order to obtain the greatest possible range, it is necessary to pack as much propellant in the chamber as is possible, without reducing the free port area to a volume so low that excessive pressures will be developed within the combustion chamber. In the rocket motor of the type referred to above, the burning surface area of the propellant increases with the length of the combustion chamber measured in the direction of the gas flow, and since the amount of gas evolved per unit time is dependent upon burning area, increasing with said area, in accordance with this invention, the rocket motor is so designed as to have a free port area which is non-uniform and which increases with the direction of the gas flow.

Accordingly, it is an object of this invention to provide design criteria for rocket propelled projectiles to produce the maximum range of such projectile relative to its "dead load."

It is a particular object of this invention to define the relationship between free port area and burning surface area which will yield optimum range for a rocket motor of any given size.

A further specific object of this invention is to provide a rocket motor construction having a free port area which is non-uniform and which increases in the direction of gas flow but which at any point is proportioned to the burning surface area of all the propellant disposed in a counter gas flow direction from such point.

The specific nature of the invention as well as other objects and advantages thereof will clearly appear from a description of a preferred embodiment as shown in the accompanying drawings in which:

Fig. 1 is a longitudinal sectional view of a rocket projectile showing the arrangement of powder grains in the rocket motor having an axial burster tube therein.

Fig. 2 is a cross sectional view taken along the line 2—2 of Fig. 1.

Fig. 3 is a longitudinal sectional view of a rocket projectile showing another arrangement of powder grains contained within the rocket motor in accordance with this invention.

Fig. 4 is a cross sectional view taken along the line 4—4 of Fig. 3.

Fig. 5 is a cross sectional view taken along the line 5—5 of Fig. 3.

Fig. 6 is a cross sectional view taken along the line 6—6 of Fig. 3.

In accordance with this invention, optimum performance will be achieved by any rocket motor in which the free port area of the combustion chamber is proportioned to the burning surface area of the propellant in a counter gas flow direction from such section. In one construction, a combustion chamber is utilized having a uniform cross-sectional area and the mass of the propellant is varied to produce a variable density of loading, the more dense loading being toward the head of the projectile and the less dense loading toward the nozzle. In other constructions, the mass of the propellant is uniform along the length of the combustion chamber but the cross-sectional area of the chamber varies, that is, the cross-sectional area of the combustion chamber is smaller at the head and increases toward the nozzle.

In this latter design, and particularly where powder grains of uniform size and loading are utilized, the increase in surface area of the powder is directly proportional to the increase in length of the chamber. In such designs, it is proposed in accordance with this invention, that the free port area should also increase in such direction proportionally with the increase in length of the chamber. By providing such a non-uniform free port area increasing toward the nozzle, a larger amount of propellant may be packed within a given length combustion chamber than heretofore believed possible, at the same time maintaining a substantially flat-top pressure-time curve having its maximum pressure well within the safe limits imposed by the wall thickness of the combustion chamber. Considering specifically a propellent charge comprising the double base powder, heretofore referred to, which has a heat of explosion of about 1200 calories per gram and a burning rate of about one inch per second at pressures of 2000 pounds per square inch, in accordance with this invention, at any section along the combustion chamber, the powder charge should be arranged so that the free port area should not be less than one hundredth of the burning surface area of the propellant in a counter gas flow direction away from that section. Obviously, different propellants having radically different caloric burning rates may be used wherein the ratio of one to a hundred may not produce the best results or at least ratios less than one to a hundred may be used without developing excessive maximum pressures. However, from the standpoint of energy content, these propellants are not as satisfactory as the double base propellant which has been mentioned as a preferred type. This invention should be understood to be independent of the particular type of propellant utilized inasmuch as the essential teaching is that of proportioning of the free port area to the burning surface area.

In the accompanying drawings there are disclosed two distinct rocket motor constructions in which a non-uniform free port area is obtained along the length of the combustion chamber and in which the free port area at any section may be readily proportioned so as to be not less than one hundredth of the initial burning area of the propellant located in the chamber on the counter gas flow side of such section. In other words, the free port area should be increased along the combustion chamber toward the nozzle so that the burning area of the powder forward of section of which the free port area is measured will not be greater than one hundred times the free port area at that point.

It should be distinctly understood that the term free-port area is applied to the difference between the cross-sectional area of the combustion chamber and the total cross-sectional area of the propellent grain in that section before any burning has taken place; and that burning area defines the exposed surface area of the propellant on the side of any section taken along the length of the combustion chamber in a direction opposite to that of the gas flow; density of loading in any section along the combustion chamber defines the ratio of the mass of the propellant on the counter gas flow direction side of the section to the volume of the combustion chamber on such side of the section.

Referring now to the drawings and more particularly to Fig. 1, there is shown a rocket projectile comprising a generally cylindrical tube 1 shaped to define a combustion chamber 10 having at the rear thereof an inwardly flared portion 11 leading to the throat 12 of a nozzle 13. Nozzle 13 may be integrally formed within the combustion chamber 10 and is provided with a rearwardly and outwardly flaring exit portion 14 for expanding the propellent gases. Secured to the forward portion of combustion chamber 10 is a nose section 15 which has a long rearwardly extending tube 16 generally referred to as a burster tube, formed integrally therewith. Both the nose section 15 and burster tube 16 are filled with a high explosive and a suitable fuse (not shown) is provided to detonate such explosive charge. The explosive contained in burster tube 16 will thus fragment combustion chamber 10 upon detonation. The propellent charge comprises a plurality of generally cylindrical powder grains 17, each having a single concentric cylindrical perforation 17a extending therethrough. Grains 17 are supported within the combustion chamber 10 by being threaded on trap wires 18. Trap wires 18 are arranged so that the powder grains will be supported in spaced relationship between the inner walls of the combustion chamber 10, the burster tube 16, and the nozzle throat 12. In accordance with this invention, the burster tube 16 is taperingly shaped with the small diameter portion terminating adjacent the nozzle 13. Although not strictly necessary, the trap wires 18 are preferably disposed substantially parallel to the exterior surface of the tapered burster tube 16. With the described construction, it is obvious that the free port area is non-uniform along the length of the combustion chamber 10, and particularly, the free port area increases proportionally along such length from the head of the projectile toward the nozzle. In other words, the effective cross sectional area of the combustion chamber between tube 1 and tube 16, increases in a uniform manner from front to rear of the chamber. The taper of the burster tube is selected in accordance with this invention relative to the number and diameter of the powder grains 17 so that the free port area at any cross section of the rocket chamber 10 is at least 1/100 of the surface area of all of the propellant on the nose side of such section. This construction permits a maximum amount of propellent charge to be safely burned in the combustion chamber for a given wall thickness thereof and thus provides maximum range of the projectile relative to its "dead load."

In Figs. 3 through 6, there is illustrated a further modification of this invention. In this modification no burster tube is provided within the combustion chamber 10. The explosive charge is confined entirely within the nose portion 15. Thus the cross sectional area of the generally cylindrical combustion chamber 10 is uniform throughout the length of that portion of the chamber where the propellant is normally carried.

In accordance with this invention the propellent grains are then loaded in the combustion chamber 10 in such a manner as to vary the density of loading of the propellant along the length of the combustion chamber, the loading density decreasing from the nose to the nozzle. Obviously a variety of methods of securing such variable loading density may be utilized. In the specific modification shown in the drawings, the propellent grains are supported within the combustion chamber 10 on two traps. The outer cage trap 19 is composed of ten trap wires 18 which are secured to the base 21 of the nose portion 15 of the projectile in spaced relationship around the periphery thereof. Three powder grains 17 are threaded on each of the trap wires 18. The trap wires 18 may be arranged with respect to the interior walls of the combustion chamber 10 so as to taper inwardly to provide an increasing area between the inner surface of the chamber and the periphery of the powder grains 17 along the length of the chamber.

Seven additional powder grains are supported on the second trap system. The trap wires 24 comprising the second trap system are preferably of the "wormshead" type described in my copending application Serial No. 538,315, filed June 1, 1944. Each of the trap wires 24 are secured at their forward end to base 21, one wire being located along the axis of the combustion chamber and six additional wires being positioned about the axis at the vertices of a hexagon. The central trap wire 24 extends two-thirds the length of the combustion chamber 10 and accordingly, in the specific example disclosed, supports two powder grains 17. Three equiangularly spaced trap wires 24 extend only about ⅓ the length of the combustion chamber 10, supporting only one powder grain, while the remaining three equiangularly spaced trap wires 24 extend ⅔ the length of the combustion chamber 10, each supporting two propellant grains 17. With this construction a variation in density of loading is obtained along the length of the combustion chamber. The dynamic balance of the projectile is however not affected.

The size of the powder grains is determined by the geometry of any specific case, to maintain a satisfactory free port area and burning surface ratio in accordance with the teachings of this invention. Here again the size of the powder grain is selected with respect to the interior diameter of the combustion chamber 10 so that at any section along the length of the combustion chamber, the free port area at that section is equal to or greater than 1/100 of the burning surface area of the powder grains located on the nose side of such section.

In the construction shown in Fig. 3, a total of seventeen powder grains is located in the vicinity of section 4—4 near the nose of the projectile. Proceeding rearwardly from section 4—4, at section 5—5, only fourteen powder grains are found. On still further approach to the nozzle, such as at section 6—6, only ten powder grains are found. Obviously more than three individual powder grains may be supported on each trap wire so that the loading density of the propellant may be varied in smaller increments. Likewise more than three sections having a different number of powder grains may be provided so long as the surface area of the powder grains forward of the section is not more than one hundred times the free port area at that section.

I claim:

1. In a rocket, a nose section having an apertured rear wall, a tube forming a combustion chamber secured to said nose section over and about said aperture, and a burster tube secured within said aperture in fluid-tight relation with said nose section, said burster tube extending axially through said combustion chamber and having a cross sectional arear decreasing from said aperture to the rear end thereof.

2. In a rocket, a nose section having an apertured rear wall, a cylindrical combustion tube of uniform cross section forming a combustion chamber for propellant therein, said tube being rigidly secured to and about said rear wall to enclose said aperture, and a burster tube secured in gas-tight relation in and about said aperture and extending rearwardly into and substantially the full length of said combustion chamber, said burster tube being generally conical in form and tapering rearwardly from said aperture, whereby the effective cross sectional area of said combustion chamber increases from front to rear thereof.

CLARENCE N. HICKMAN.

REFERENCES CITED

The following references are of record in the file of this patent:

UNITED STATES PATENTS

| Number | Name | Date |
|--------|------|------|
| 2,402,809 | Farr | June 25, 1946 |
| 2,405,415 | Eksergian | Aug. 6, 1946 |
| 2,406,560 | Pope | Aug. 27, 1946 |

FOREIGN PATENTS

| Number | Country | Date |
|--------|---------|------|
| 139,856 | Great Britain | Mar. 18, 1920 |